United States Patent
Jiang (10) Patent No.: US 11,317,341 B2
(45) Date of Patent: Apr. 26, 2022

(54) SYSTEM INFORMATION REQUEST ADJUSTMENT METHOD AND APPARATUS, AND USER EQUIPMENT

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 50 days.

(21) Appl. No.: 16/977,995

(22) PCT Filed: Mar. 16, 2018

(86) PCT No.: PCT/CN2018/079339
§ 371 (c)(1),
(2) Date: Sep. 3, 2020

(87) PCT Pub. No.: WO2019/174049
PCT Pub. Date: Sep. 19, 2019

(65) Prior Publication Data
US 2021/0076307 A1 Mar. 11, 2021

(51) Int. Cl.
*H04W 48/12* (2009.01)
*H04W 76/27* (2018.01)
(Continued)

(52) U.S. Cl.
CPC .......... *H04W 48/12* (2013.01); *H04W 48/14* (2013.01); *H04W 74/0833* (2013.01); *H04W 76/27* (2018.02); *H04W 80/02* (2013.01)

(58) Field of Classification Search
CPC . H04W 48/12; H04W 48/14; H04W 74/0833; H04W 76/27; H04W 80/02; H04W 76/40
See application file for complete search history.

(56) References Cited

U.S. PATENT DOCUMENTS

2019/0349837 A1\* 11/2019 Shih ................. H04W 76/27
2020/0413452 A1\* 12/2020 Ishii ................. H04W 48/12

FOREIGN PATENT DOCUMENTS

| CN | 103297207 A | 9/2013 |
| CN | 106664660 A | 5/2017 |

(Continued)

OTHER PUBLICATIONS

Notice of Allowance of Chinese Application No. 201880000281.7, dated Apr. 6, 2021.
(Continued)

*Primary Examiner* — Kyaw Z Soe
(74) *Attorney, Agent, or Firm* — Finnegan, Henderson, Farabow, Garrett & Dunner, L.L.P.

(57) ABSTRACT

A system information (SI) request adjustment method includes: if a first system information block (SIB1) indicates that SI to be acquired by UE is not being broadcast, sending an SI request to a base station via a first message (MSG1) or a third message (MSG3); and if a present SI request process is not completed yet, and SI required to be requested within a next SI modification period that is entered changes relative to the SI requested in the present SI request process, sending a new SI request to the base station through a new MSG1 or a new MSG3.

19 Claims, 4 Drawing Sheets

---

If a SIB1 indicates that SI to be acquired by UE is not being broadcast, an SI request is sent to a base station through an MSG1 or an MSG3 — S101

If a present SI request process is not completed yet and SI required to be requested in a next SI modification period that is entered changes relative to SI requested in the present SI request process, a new SI request is sent to the base station through a new MSG1 or a new MSG3 — S102

(51) Int. Cl.
*H04W 48/14* (2009.01)
*H04W 74/08* (2009.01)
*H04W 80/02* (2009.01)

(56) References Cited

FOREIGN PATENT DOCUMENTS

| | | |
|---|---|---|
| CN | 107223353 A | 9/2017 |
| CN | 107708179 A | 2/2018 |
| CN | 101651891 A | 2/2020 |
| WO | WO 2018/012894 A1 | 1/2018 |

OTHER PUBLICATIONS

Huawei et al. Further Considerations of "Other SI", 3GPP TSG-RAN2 Meeting #96, R2-167580, Reno, Nevada, Nov. 14-18, 2016 6 pages.
International Search Report in International Application No. PCT/CN2018/079339, dated Aug. 13, 2018.
Written Opinion of International Search Authority in International Application No. PCT/CN2018/079339, dated Aug. 13, 2018.
3GPP TS 38.321 V15.0.0 (Dec. 2017), 3rd Generation Partnership Project; Technical Specification Group Radio Access Network; NR; Medium Access Control (MAC) protocol specification (Release 15), 55 pages.
3GPP TS 38.331 V15.0.0 (Dec. 2017), 3rd Generation Partnership Project; Technical Specification Group Radio Access Network NR; Radio Resource Control (RRC) protocol specification (Release 15), 188 pages.
First Office Action of Chinese Application No. 201880000281.7, dated Mar. 28, 2019.

\* cited by examiner

SYSTEM INFORMATION REQUEST ADJUSTMENT METHOD AND APPARATUS, AND USER EQUIPMENT

CROSS REFERENCE TO RELATED APPLICATIONS

This application is a national phase application based on International Application No. PCT/CN2018/079339, filed Mar. 16, 2018, the content of which is incorporated herein by reference.

TECHNICAL FIELD

The present disclosure generally relates to the technical field of communication, and more particularly, to a system information (SI) request adjustment method and device, user equipment (UE) and a computer-readable storage medium.

BACKGROUND

In a 5th generation (5G) system, SI may be divided into first-type SI and second-type SI. The first-type SI at least includes a master information block (MIB) and a first system information block (SIB1). For the first-type SI, a base station sends it to UE in a broadcast manner without a request of the UE. For the second-type SI, the base station may indicate whether each piece of SI, except for the SIB1, is presently broadcast in SI scheduling information of the SIB1. If it is presently broadcast, the UE may directly acquire the broadcast SI; and if it is not presently broadcast, for UE in an idle or inactive state, the UE may send an SI request through a first message (MSG1) or a third message (MSG3); and the base station, after receiving the SI request, sends a response message to the UE through an MSG2 or an MSG4. The UE, after receiving the response message sent by/from the base station, receives the SI after an SI window of the requested SI arrives.

At present, after the UE sends the SI request, the base station may broadcast SI in a window corresponding to the SI according to the SI requested by the UE. The base station periodically broadcasts the SI until a present SI modification period ends. In a next SI modification period, if no UE requests the SI, the base station may not broadcast the SI.

However, if UE, after sending the SI request, may not receive an SI response returned by the base station, the UE is required to resend the SI request, and the resent SI request is in a new SI modification period. According to a present solution based on an MSG1 or MSG3 for random access, the UE does not change the message when resending the MSG1 or the MSG3. This means that the UE may request all SI, required in a previous SI modification period, in the new SI modification period. However, it is very likely that the UE has received part of SI in the requested SI in the previous SI modification period. If the SI request is resent in the new SI modification period, the base station may broadcast the SI, that has been received in the previous SI modification period, in the new SI modification period, resulting in unnecessary SI broadcasting.

SUMMARY

In view of this, the present application discloses an SI request adjustment method and device, UE and a computer-readable storage medium, to avoid unnecessary SI broadcasting of a base station side.

According to a first aspect of embodiments of the present disclosure, an SI request adjustment method is provided, which may be applied to UE and include that:

in response to a SIB1 indicating that SI to be acquired by the UE is not being broadcast, an SI request is sent to a base station through an MSG1 or an MSG3; and in response to a present SI request process not being completed yet and SI required to be requested in a next SI modification period that is entered changes relative to SI requested in the present SI request process, a new SI request is sent to the base station through a new MSG1 or a new MSG3.

In an embodiment, the operation that the new SI request is sent to the base station through the new MSG1 or the new MSG3 may include that:

a random access process implemented based on a present SI request is ended, and the new SI request is sent to the base station based on a new random access process initiated through the new MSG1; or the random access process implemented based on the present SI request is ended, and the new SI request is sent to the base station based on a new random access process initiated through the new MSG3; or the random access process implemented based on the present SI request is continued, and the new SI request is sent to the base station through the new MSG1; or the random access process implemented based on the present SI request is continued, and the new SI request is sent to the base station through the new MSG3.

In an embodiment, the operation that the random access process implemented based on the present SI request is ended and the new SI request is sent to the base station based on the new random access process initiated through the new MSG1 may include that:

a radio resource control (RRC) layer sends first indication information to a media access control (MAC) layer, the first indication information being configured to instruct the MAC layer to initiate the new random access process; and the MAC layer ends the random access process implemented based on the present SI request according to the first indication information, determines a new preamble and initiates the new random access process to request new SI.

In an embodiment, the operation that the random access process implemented based on the present SI request is ended and the new SI request is sent to the base station based on the new random access process initiated through the new MSG3 may include that:

an RRC layer sends second indication information to a MAC layer, generates a new RRC message and sends the new RRC message to the MAC layer, the second indication information being configured to instruct the MAC layer to initiate the new random access process; and the MAC layer ends the random access process implemented based on the SI request according to the second indication information and initiates the new random access process by using the new RRC message to request new SI.

In an embodiment, the random access process implemented based on the present SI request is continued and the new SI request is sent to the base station through the new MSG1 may include that:

an RRC layer sends third indication information to a MAC layer, the third indication information being configured to indicate at least one of a new preamble or a new physical random access channel (PRACH) resource to the MAC layer; and the MAC layer receives the third indication information and retransmits the MSG1 by using at least one of the new preamble or the new PRACH resource to request new SI.

In an embodiment, the random access process implemented based on the present SI request is continued and the new SI request is sent to the base station through the new MSG3 may include that:

an RRC layer generates a new RRC message and sends the new RRC message to a MAC layer; and the MAC layer retransmits the MSG3 by using the new RRC message to request new SI.

In an embodiment, the first indication information may indicate at least one of the new preamble or a new PRACH resource to the MAC layer; and the operation that the new preamble is determined may include that:

the new preamble is determined according to the first indication information.

In an embodiment, the operation that the MAC layer ends the random access process implemented based on the SI request according to the second indication information may include that:

the MAC layer clears a hybrid automatic repeat request (HARQ) cache configured to transmit the MSG3.

According to a second aspect of embodiments of the present disclosure, an SI request adjustment device is provided, which may be applied to UE and include:

a first sending module, configured to, in response to a SIB1 indicating that SI to be acquired by the UE is not being broadcast, send an SI request to a base station through an MSG1 or an MSG3, and a second sending module, configured to, in response to a present SI request process corresponding to the SI request sent by the first sending module not being completed yet and SI required to be requested in a next SI modification period that is entered changes relative to SI requested in the present SI request process, send a new SI request to the base station through a new MSG1 or a new MSG3.

In an embodiment, the second sending module may include:

a first sending submodule, configured to end a random access process implemented based on a present SI request and send the new SI request to the base station based on a new random access process initiated through the new MSG1; or a second sending submodule, configured to end the random access process implemented based on the present SI request and send the new SI request to the base station based on a new random access process initiated through the new MSG3; or a third sending submodule, configured to continue the random access process implemented based on the present SI request and send the new SI request to the base station through the new MSG1; or a fourth sending submodule, configured to continue the random access process implemented based on the present SI request and send the new SI request to the base station through the new MSG3.

In an embodiment, the first sending submodule may include:

a first sending unit, configured to send first indication information to a MAC layer, the first indication information being configured to instruct the MAC layer to initiate the new random access process; and a first ending and initiation unit, configured to end the random access process implemented based on the present SI request according to the first indication information sent by the first sending unit, determine a new preamble and initiate the new random access process to request new SI.

In an embodiment, the second sending submodule may include:

a second sending unit, configured to send second indication information to a MAC layer, generate a new RRC message and send the new RRC message to the MAC layer, the second indication information being configured to instruct the MAC layer to initiate the new random access process; and a second ending and initiation unit, configured to end the random access process implemented based on the SI request according to the second indication information sent by the second sending unit and initiate the new random access process by using the new RRC message to request new SI.

In an embodiment, the third sending submodule may include:

a third sending unit, configured to send third indication information to a MAC layer, the third indication information being configured to indicate at least one of a new preamble or a new PRACH resource to the MAC layer; and a first retransmission unit, configured to receive the third indication information sent by the third sending unit and retransmit the MSG1 by using at least one of the new preamble or the new PRACH resource to request new SI.

In an embodiment, the fourth sending submodule may include:

a fourth sending unit, configured to generate a new RRC message and send the new RRC message to a MAC layer; and a second retransmission unit, configured to retransmit the MSG3 by using the new RRC message sent by the fourth sending unit to request new SI.

In an embodiment, the first indication information may indicate at least one of the new preamble or a new PRACH resource to the MAC layer; and the first ending and initiation unit may be configured to determine the new preamble according to the first indication information.

In an embodiment, the second ending and initiation unit may be configured to clear a HARQ cache configured to transmit the MSG3.

According to a third aspect of the embodiments of the present disclosure, UE is provided, which may include:

a processor; and a memory configured to store instructions executable by the processor.

The processor may be configured to:

in response to a SIB1 indicating that SI to be acquired by the UE is not being broadcast, send an SI request to a base station through an MSG1 or an MSG3; and in response to a present SI request process not being completed yet and SI required to be requested in a next SI modification period that is entered changes relative to SI requested in the present SI request process, send a new SI request to the base station through a new MSG1 or a new MSG3.

According to a fourth aspect of the embodiments of the present disclosure, a computer-readable storage medium is provided, in which computer instructions may be stored, the instructions being executed by a processor to implement the steps of the SI request adjustment method.

The technical solutions in the embodiments of the present disclosure may have the following beneficial effects.

When the present SI request process is not completed yet and the SI required to be requested in the next SI modification period that is entered changes relative to the SI requested in the present SI request process, the new SI request is sent to the base station through the new MSG1 or the new MSG3, so as to avoid the base station broadcasting SI that has been received in a previous SI modification period in a new SI modification period, thereby avoiding unnecessary SI broadcasting.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
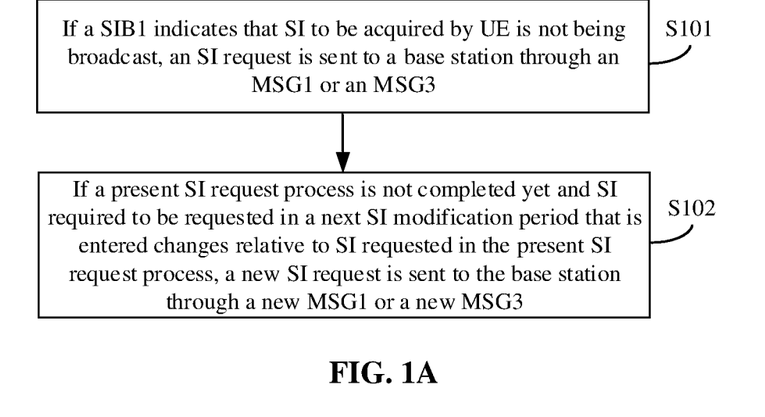
FIG. 1A is a flow chart showing an SI request adjustment method, according to an exemplary embodiment of the present application.

FIG. 1A is a flow chart showing an SI request adjustment method, according to an exemplary embodiment of the present application. The embodiment is described at a UE side. As illustrated in FIG. 1A, the SI request adjustment method includes the following steps.

In S101, if a first system information block (SIB1) indicates that SI to be acquired by UE is not being broadcast, an SI request is sent to a base station through a first message (MSG1) or a third message (MSG3).

The base station may broadcast first-type SI (minimum SI), and the minimum SI includes a MIB and a SIB1. The SIB1 indicates scheduling information of other SI such as a second SIB (SIB2), a third SIB (SIB3), a fourth SIB (SIB4), and the like. The scheduling information may include information about whether each piece of SI in the other SI is being broadcast, and the like. The UE may acquire the specific SI scheduled by the base station and whether the SI is being broadcast from the minimum SI.

If the UE determines according to the indication of the SIB1 that the SI to be acquired by it is not being broadcast, the SI request may be sent to the base station through the MSG1 or the MSG3.

In S102, if a present SI request process is not completed yet and SI required to be requested in a next SI modification period that is entered changes relative to SI requested in the present SI request process, a new SI request is sent to the base station through a new MSG1 or a new MSG3.

In the embodiment, if the present SI request process is not completed yet, for example, an SI response returned by the base station is not received yet, and when the SI presently required to be requested in the next SI modification period that is entered changes relative to the SI requested in the present SI request process, the new SI request is sent by using the new MSG1 or the new MSG3. For example, if the SI presently required to be requested is SI 1 and SI 2 but the SI requested in the present SI request process is the SI 1, the SI 2 and SI 3, the new SI request is sent by using the new MSG1 or the new MSG3.

The new SI request may be sent by using the new MSG1 or the new MSG3 in, but not limited to, the following manners.

In the first manner, a random access process implemented based on a present SI request is ended, and the new SI request is sent to the base station based on a new random access process initiated through the new MSG1.

In the embodiment, an RRC layer may send first indication information to a MAC layer, and the first indication information is configured to instruct the MAC layer to initiate the new random access process. The MAC layer ends the random access process implemented based on the present SI request according to the first indication information, determines a new preamble and initiates the new random access process to request new SI.

The first indication information includes at least one of the new preamble or a new PRACH resource to the MAC layer, and the UE may determine the new preamble according to the first indication information.

The new preamble and the new PRACH resource represent that the requested SI is SI presently required to be received by the UE.

In the second manner, the random access process implemented based on the present SI request is ended, and the new SI request is sent to the base station based on a new random access process initiated through the new MSG3.

In the embodiment, the RRC layer sends second indication information to the MAC layer, generates a new RRC message and sends the new RRC message to the MAC layer. The second indication information is configured to instruct the MAC layer to initiate the new random access process. The MAC layer ends the random access process implemented based on the SI request according to the second indication information and initiates the new random access process by using the new RRC message to request the new SI.

The operation that the MAC layer ends the random access process implemented based on the SI request includes that: the MAC layer clears a HARQ cache configured to transmit the MSG3.

In the third manner, the random access process implemented based on the present SI request is continued, and the new SI request is sent to the base station through the new MSG1.

In the embodiment, the RRC layer sends third indication information to the MAC layer, and the third indication information is configured to indicate at least one of a new preamble or a new PRACH resource to the MAC layer. The MAC layer receives the third indication information and retransmits the MSG1 by using at least one of the new preamble or the new PRACH resource to request the new SI.

In the fourth manner, the random access process implemented based on the present SI request is continued, and the new SI request is sent to the base station through the new MSG3.

In the embodiment, the RRC layer generates a new RRC message and sends the new RRC message to the MAC layer. The MAC layer retransmits the MSG3 by using the new RRC message to request the new SI.

It can be seen that, according to the embodiment, the new SI request may be sent to the base station through the new MSG1 or the new MSG3 in multiple manners, and implementation manners are flexible and diverse.

According to the embodiment, when the present SI request process is not completed yet and the SI required to be requested in the next SI modification period that is entered changes relative to the SI requested in the present SI request process, the new SI request is sent to the base station through the new MSG1 or the new MSG3, so as to avoid the base station broadcasting SI that has been received in a previous SI modification period in a new SI modification period, thereby avoiding unnecessary SI broadcasting.

Figure 1B:
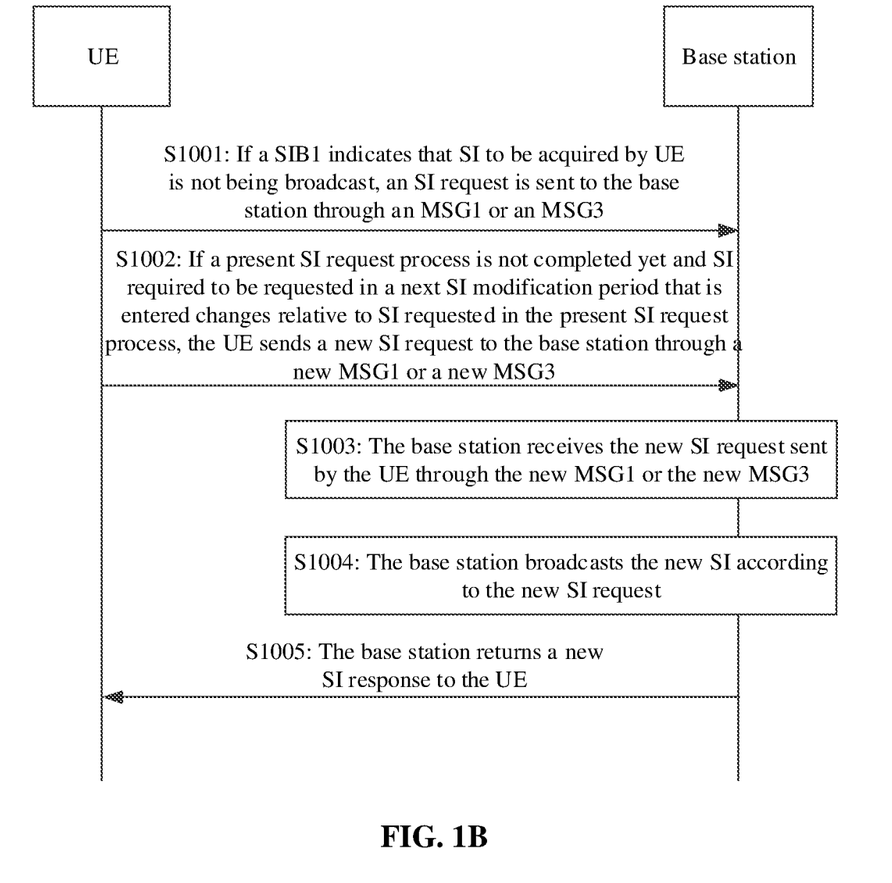
FIG. 1B is a signaling flow chart showing an SI request adjustment method, according to an exemplary embodiment of the present application.

FIG. 1B is a signaling flow chart showing an SI request adjustment method, according to an exemplary embodiment of the present application. The embodiment is described from an angle of interaction between UE and a base station. As illustrated in FIG. 1B, the method includes the following steps.

In S1001, if a SIB1 indicates that SI to be acquired by the UE is not being broadcast, the UE sends an SI request to the base station through an MSG1 or an MSG3.

In S1002, if a present SI request process is not completed yet and SI required to be requested in a next SI modification period that is entered changes relative to SI requested in the present SI request process, the UE sends a new SI request to the base station through a new MSG1 or a new MSG3.

The new SI requested by the UE is SI that the UE does not receive in a previous SI modification period, such that the base station is not required to broadcast the SI that has been received in the previous SI modification period in a present SI modification period, so as to avoid unnecessary SI broadcasting.

In S1003, the base station receives the new SI request sent by the UE through the new MSG1 or the new MSG3.

In S1004, the base station broadcasts the new SI according to the new SI request.

The base station broadcasts the new SI in a window corresponding to the new SI.

In S1005, the base station returns a new SI response to the UE.

There is no strict execution sequence between S1004 and S1005, that is, S1004 may be executed at first before S1005 is executed, or S1005 may be executed before S1004 is executed.

According to the embodiment, through the interaction between the base station and the UE, the UE may send the new SI request to the base station through the new MSG1 or the new MSG3, so as to avoid the base station broadcasting the SI that has been received in the previous SI modification period in a new SI modification period, thereby avoiding unnecessary SI broadcasting.

Figure 2:
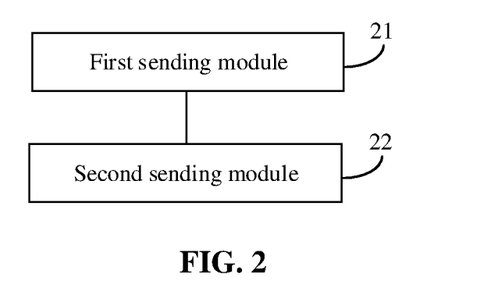
FIG. 2 is a block diagram of an SI request adjustment device, according to an exemplary embodiment.

FIG. 2 is a block diagram of an SI request adjustment device, according to an exemplary embodiment. The device may be set in UE. As illustrated in FIG. 2, the device includes a first sending module 21 and a second sending module 22.

The first sending module 21 is configured to, if a SIB1 indicates that SI to be acquired by the UE is not being broadcast, send an SI request to a base station through an MSG1 or an MSG3.

The base station broadcasts first-type SI (minimum SI), and the minimum SI includes a MIB and a SIB1. The SIB1 indicates scheduling information of other SI such as a SIB2, a SIB3, a SIB4, and the like. The scheduling information may include information about whether each piece of SI in the other SI is being broadcast, and the like. The UE may acquire the specific SI scheduled by the base station and whether the SI is being broadcast from the minimum SI.

If the first sending unit 21 may send, if determining according to the indication of the SIB1 that the SI to be acquired by it is not being broadcast, the SI request to the base station through the MSG1 or the MSG3.

The second sending module 22 is configured to, if a present SI request process corresponding to the SI request sent by the first sending module 21 is not completed yet and SI required to be requested in a next SI modification period that is entered changes relative to SI requested in the present SI request process, send a new SI request to the base station through a new MSG1 or a new MSG3.

In the embodiment, if the present SI request process is not completed yet, for example, an SI response returned by the base station is not received yet, and when the SI presently required to be requested in the next SI modification period that is entered changes relative to the SI requested in the present SI request process, the new SI request is sent by using the new MSG1 or the new MSG3. For example, if the SI presently required to be requested is SI 1 and SI 2 but the SI requested in the present SI request process is the SI 1, the SI 2 and SI 3, the new SI request is sent by using the new MSG1 or the new MSG3.

According to the embodiment, when the present SI request process is not completed yet and the SI required to be requested in the next SI modification period that is entered changes relative to the SI requested in the present SI request process, the new SI request is sent to the base station through the new MSG1 or the new MSG3, so as to avoid the base station broadcasting SI that has been received in a previous SI modification period in a new SI modification period, thereby avoiding unnecessary SI broadcasting.

Figure 3:
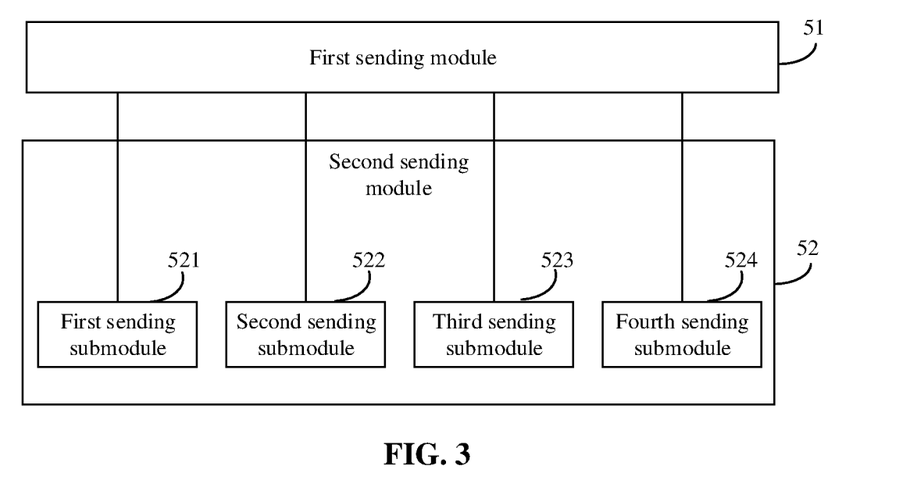
FIG. 3 is a block diagram of another SI request adjustment device, according to an exemplary embodiment.

FIG. 3 is a block diagram of another SI request adjustment device, according to an exemplary embodiment. As illustrated in FIG. 3, based on the embodiment illustrated in FIG. 2, the second sending module 52 may include a first sending submodule 521, a second sending submodule 522, a third sending submodule 523 or a fourth sending submodule 524.

The first sending submodule 521 is configured to end a random access process implemented based on a present SI request and send the new SI request to the base station based on a new random access process initiated through the new MSG1.

The second sending submodule 522 is configured to end the random access process implemented based on the present SI request and send the new SI request to the base station based on a new random access process initiated through the new MSG3.

The third sending submodule 523 is configured to continue the random access process implemented based on the present SI request and send the new SI request to the base station through the new MSG1.

The fourth sending submodule 524 is configured to continue the random access process implemented based on the present SI request and send the new SI request to the base station through the new MSG3.

According to the embodiment, the new SI request may be sent to the base station through the new MSG1 or the new MSG3 in multiple manners, and implementation manners are flexible and diverse.

Figure 4:
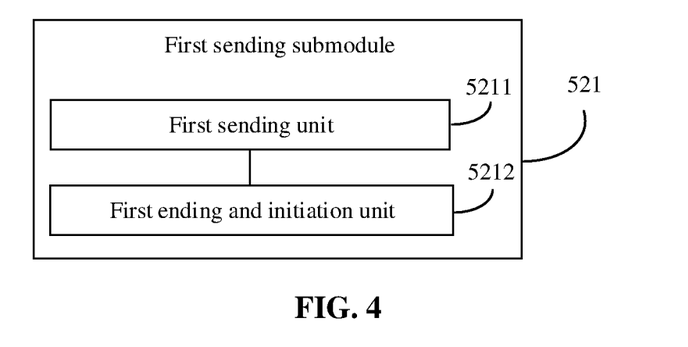
FIG. 4 is a block diagram of another SI request adjustment device, according to an exemplary embodiment.

FIG. 4 is a block diagram of another SI request adjustment device, according to an exemplary embodiment. As illustrated in FIG. 4, based on the embodiment illustrated in FIG. 3, the first sending submodule 521 may include a first sending unit 5211 and a first ending and initiation unit 5212.

The first sending unit 5211 is configured to send first indication information to a MAC layer, and the first indication information is configured to instruct the MAC layer to initiate the new random access process.

The first ending and initiation unit 5212 is configured for the MAC layer to end the random access process implemented based on the present SI request according to the first indication information sent by the first sending unit 5211, determine a new preamble and initiate the new random access process to request new SI.

The first sending unit 5211 is in an RRC layer, and the first ending and initiation unit 5212 is in the MAC layer.

The first indication information includes at least one of the new preamble or a new PRACH resource to the MAC layer, and the UE may determine the new preamble according to the first indication information.

The new preamble and the new PRACH resource represent that the requested SI is SI presently required to be received by the UE.

For the SI request based on the MSG1, the first sending unit 5211 in the RRC layer sends the first indication information to the MAC layer, and the first ending and initiation unit 5212 in the MAC layer ends the random access process implemented based on the present SI request according to the first indication information, determines the new preamble and initiates the new random access process to request the new SI.

According to the embodiment, the random access process implemented based on the present SI request is ended, the new preamble is determined, and the new random access process is initiated to request the new SI, such that unnecessary SI broadcasting of a base station side is avoided.

Figure 5:
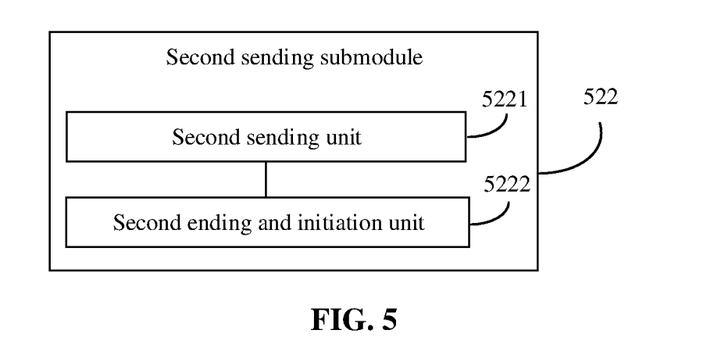
FIG. 5 is a block diagram of another SI request adjustment device, according to an exemplary embodiment.

FIG. 5 is a block diagram of another SI request adjustment device, according to an exemplary embodiment. As illustrated in FIG. 5, based on the embodiment illustrated in FIG. 3, the second sending submodule 522 may include a second sending unit 5221 and a second ending and initiation unit 5222.

The second sending unit 5221 is configured to send second indication information to a MAC layer, generate a new RRC message and send the new RRC message to the MAC layer. The second indication information is configured to instruct the MAC layer to initiate the new random access process.

The second ending and initiation unit 5222 is configured to end the random access process implemented based on the SI request according to the second indication information sent by the second sending unit 5221 and initiate the new random access process by using the new RRC message to request new SI.

The second sending unit 5221 is in an RRC layer, and the second ending and initiation unit 5222 is in the MAC layer.

For the SI request based on the MSG3, the second sending unit 5221 in the RRC layer sends the second indication information to the MAC layer, simultaneously generates the new RRC message and sends it to the MAC layer. The second ending and initiation unit 5222 in the MAC layer ends the random access process implemented based on the SI request according to the second indication information and initiates the new random access process by using the new RRC message to request the new SI.

According to the embodiment, the random access process implemented based on the SI request is ended, and the new random access process is initiated by using the new RRC message to request the new SI, such that unnecessary SI broadcasting of the base station side is avoided.

Figure 6:
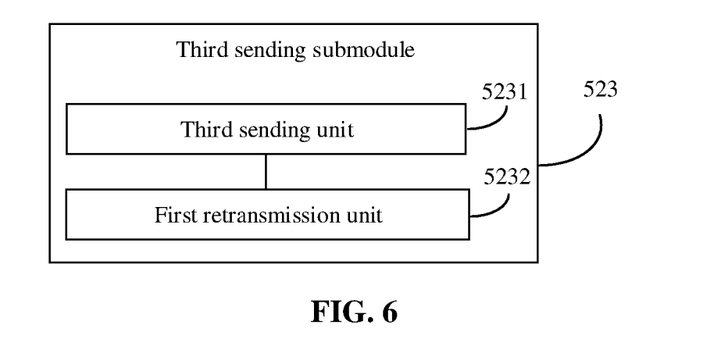
FIG. 6 is a block diagram of another SI request adjustment device, according to an exemplary embodiment.

FIG. 6 is a block diagram of another SI request adjustment device, according to an exemplary embodiment. As illustrated in FIG. 6, based on the embodiment illustrated in FIG. 3, the third sending submodule 523 may include a third sending unit 5231 and a first retransmission unit 5232.

The third sending unit 5231 is configured to send third indication information to a MAC layer, and the third indication information is configured to indicate at least one of a new preamble or a new PRACH resource to the MAC layer.

The first retransmission unit 5232 is configured to receive the third indication information sent by the third sending unit 5231 and retransmit the MSG1 by using at least one of the new preamble or the new PRACH resource to request new SI.

The third sending unit 5231 is in an RRC layer, and the first retransmission unit 5232 is in the MAC layer.

For the SI request based on the MSG1, the first retransmission unit 5232 in the RRC layer sends the third indication information to the MAC layer, and the first retransmission unit 5232 in the MAC layer, after receiving the third indication information, retransmits the MSG1 by using at least one of the new preamble or the PRACH resource.

According to the embodiment, the MSG1 is retransmitted by using at least one of the new preamble or the new PRACH resource to request the new SI, such that unnecessary SI broadcasting of the base station side is avoided.

Figure 7:
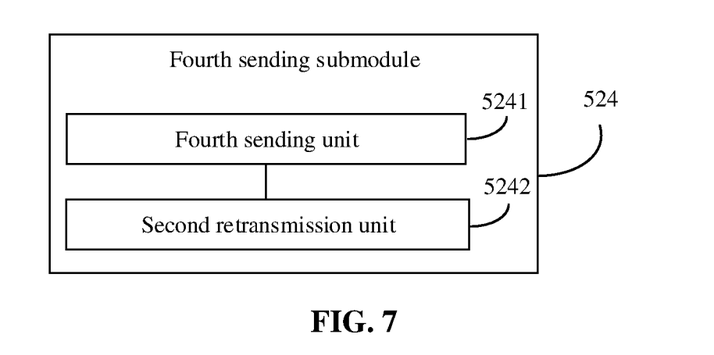
FIG. 7 is a block diagram of another SI request adjustment device, according to an exemplary embodiment.

FIG. 7 is a block diagram of another SI request adjustment device, according to an exemplary embodiment. As illustrated in FIG. 7, based on the embodiment illustrated in FIG. 3, the fourth sending submodule 524 may include a fourth sending unit 5241 and a second retransmission unit 5242.

The fourth sending unit 5241 is configured for an RRC layer to generate a new RRC message and send the new RRC message to a MAC layer.

The second retransmission unit 5242 is configured for the MAC layer to retransmit the MSG3 by using the new RRC message sent by the fourth sending unit 5241 to request new SI.

The fourth sending unit 5241 is in the RRC layer, and the second retransmission unit 5242 is in the MAC layer.

For the SI request based on the MSG3, the fourth sending unit 5241 in the RRC layer generates the new RRC message and sends it to the MAC layer. The second retransmission unit 5242 in the MAC layer retransmits the MSG3 by using the new RRC MSG.

According to the embodiment, the MSG3 is retransmitted by using the new RRC message to request the new SI, such that unnecessary SI broadcasting of the base station side is avoided.

Figure 8:
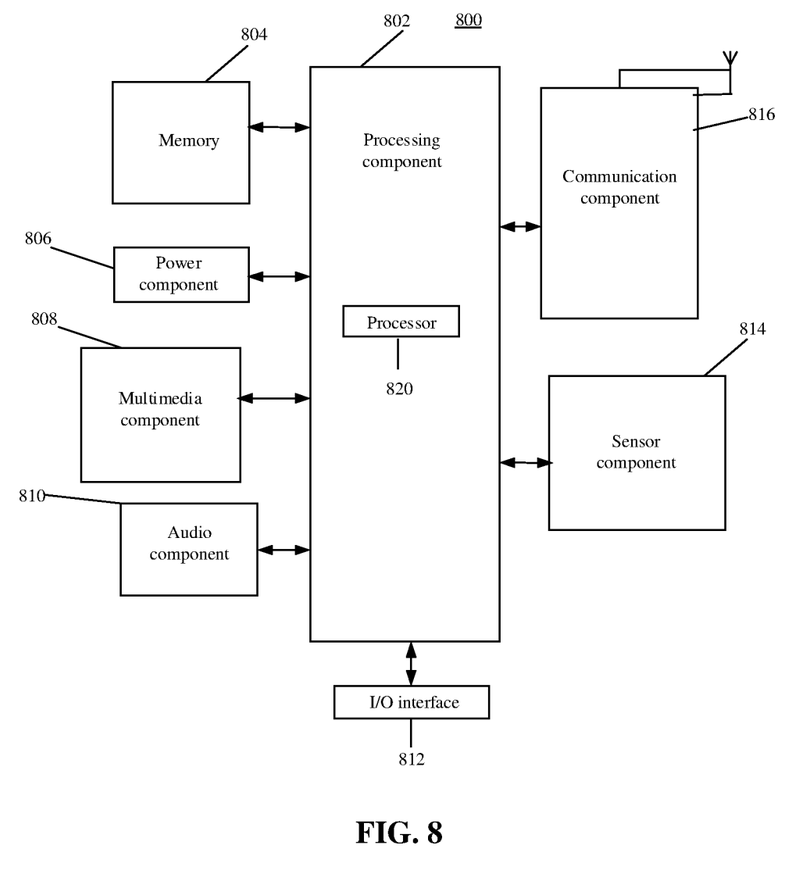
FIG. 8 is a block diagram of a device for SI request adjustment, according to an exemplary embodiment.

FIG. 8 is a block diagram of a device applied to SI request adjustment, according to an exemplary embodiment. For example, the device 800 may be UE such as a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

One processor 820 in the processing component 802 may be configured to:

if a SIB1 indicates that SI to be acquired by UE is not being broadcast, send an SI request to a base station through an MSG1 or an MSG3; and if a present SI request process is not completed yet and SI required to be requested in a next SI modification period that is entered changes relative to SI requested in the present SI request process, send a new SI request to the base station through a new MSG1 or a new MSG3.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access a communication-standard-based wireless network, such as a wireless fidelity (WiFi) network, a 2nd-generation (2G) or 3rd-generation (3G) network or a combination thereof. In an exemplary embodiment, the communication component 816 receives a broadcast signal or broadcast associated information from an external broadcast management system through a broadcast channel In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 804, executed by the processor 820 of the device 800 to implement the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second", and the like in the present disclosure are adopted only to distinguish one entity or operation from another entity or operation and not always to require or imply existence of any such practical relationship or sequence between the entities or operations. Terms "include" and "comprise" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A system information (SI) request adjustment method, applied to user equipment (UE), comprising:
   sending, in response to a first system information block (SIB1) indicating that SI to be acquired by the UE is not being broadcast, an SI request to a base station through a first message (MSG1) or a third message (MSG3); and
   sending, in response to a present SI request process not being completed yet and SI required to be requested in a next SI modification period that is entered changes relative to SI requested in the present SI request process, a new SI request to the base station through a new MSG1 or a new MSG3.

2. The method of claim 1, wherein sending the new SI request to the base station through the new MSG1 comprises one of:
   ending a random access process implemented based on a present SI request, and sending the new SI request to the base station based on a new random access process initiated through the new MSG1; or
   continuing the random access process implemented based on the present SI request, and sending the new SI request to the base station through the new MSG1.

3. The method of claim 2, wherein ending the random access process implemented based on the present SI request and sending the new SI request to the base station based on the new random access process initiated through the new MSG1 comprises:
   sending, by a radio resource control (RRC) layer, first indication information to a media access control (MAC) layer, the first indication information being configured to instruct the MAC layer to initiate the new random access process; and
   ending, by the MAC layer, the random access process implemented based on the present SI request according to the first indication information, determining a new preamble and initiating the new random access process to request new SI.

4. The method of claim 2, wherein continuing the random access process implemented based on the present SI request and sending the new SI request to the base station through the new MSG1 comprises:
   sending, by an RRC layer, third indication information to a MAC layer, the third indication information being configured to indicate at least one of a new preamble or a new physical random access channel (PRACH) resource to the MAC layer; and
   receiving, by the MAC layer, the third indication information and retransmitting the MSG1 by using at least one of the new preamble or the new PRACH resource to request new SI.

5. The method of claim 3, wherein the first indication information indicates at least one of the new preamble or a new PRACH resource to the MAC layer;
   wherein determining the new preamble comprises:
   determining the new preamble according to the first indication information.

6. The method of claim 1, wherein sending the new SI request to the base station through the new MSG3 comprises one of:
   ending a random access process implemented based on the present SI request, and sending the new SI request to the base station based on a new random access process initiated through the new MSG3; or continuing the random access process implemented based on the present SI request, and sending the new SI request to the base station through the new MSG3.

7. The method of claim 6, wherein ending the random access process implemented based on the present SI request and sending the new SI request to the base station based on the new random access process initiated through the new MSG3 comprises:
   sending, by an RRC layer, second indication information to a MAC layer, generating a new RRC message and sending the new RRC message to the MAC layer, the second indication information being configured to instruct the MAC layer to initiate the new random access process; and
   ending, by the MAC layer, the random access process implemented based on the SI request according to the second indication information and initiating the new random access process by using the new RRC message to request new SI.

8. The method of claim 6, wherein continuing the random access process implemented based on the present SI request and sending the new SI request to the base station through the new MSG3 comprises:
generating, by an RRC layer, a new RRC message and sending the new RRC message to a MAC layer; and
retransmitting, by the MAC layer, the MSG3 by using the new RRC message to request new SI.

9. The method of claim 7, wherein ending, by the MAC layer, the random access process implemented based on the SI request according to the second indication information comprises:
clearing, by the MAC layer, a hybrid automatic repeat request (HARQ) cache configured to transmit the MSG3.

10. User equipment (UE), comprising:
a processor; and
a memory configured to store instructions executable by a processor,
wherein the processor is configured to:
send, in response to a first system information block (SIB1) indicating that system information (SI) to be acquired by the UE is not being broadcast, an SI request to a base station through a first message (MSG1) or a third message (MSG3); and
send, in response to a present SI request process not being completed yet and SI required to be requested in a next SI modification period that is entered changes relative to SI requested in the present SI request process, a new SI request to the base station through a new MSG1 or a new MSG3.

11. The UE of claim 10, wherein in sending the new SI request to the base station through the new MSG1, the processor is further configured to perform one of:
ending a random access process implemented based on a present SI request, and sending the new SI request to the base station based on a new random access process initiated through the new MSG1; or
continuing the random access process implemented based on the present SI request, and sending the new SI request to the base station through the new MSG1.

12. The UE of claim 10, wherein in sending the new SI request to the base station through the new MSG3, the processor is further configured to perform one of:
ending a random access process implemented based on the present SI request, and sending the new SI request to the base station based on a new random access process initiated through the new MSG3; or
continuing the random access process implemented based on the present SI request, and sending the new SI request to the base station through the new MSG3.

13. The UE of claim 11, wherein in ending the random access process implemented based on the present SI request and sending the new SI request to the base station based on the new random access process initiated through the new MSG1, the processor is further configured to:
send, by a radio resource control (RRC) layer, first indication information to a media access control (MAC) layer, the first indication information being configured to instruct the MAC layer to initiate the new random access process; and
end, by the MAC layer, the random access process implemented based on the present SI request according to the first indication information, determining a new preamble and initiating the new random access process to request new SI.

14. The UE of claim 12, wherein in ending the random access process implemented based on the present SI request and sending the new SI request to the base station based on the new random access process initiated through the new MSG3, the processor is further configured to:
send, by an RRC layer, second indication information to a MAC layer, generate a new RRC message and send the new RRC message to the MAC layer, the second indication information being configured to instruct the MAC layer to initiate the new random access process; and
end, by the MAC layer, the random access process implemented based on the SI request according to the second indication information and initiate the new random access process by using the new RRC message to request new SI.

15. The UE of claim 11, wherein in continuing the random access process implemented based on the present SI request and sending the new SI request to the base station through the new MSG1, the processor is further configured to:
send, by an RRC layer, third indication information to a MAC layer, the third indication information being configured to indicate at least one of a new preamble or a new physical random access channel (PRACH) resource to the MAC layer; and
receive, by the MAC layer, the third indication information and retransmit the MSG1 by using at least one of the new preamble or the new PRACH resource to request new SI.

16. The UE of claim 12, wherein in continuing the random access process implemented based on the present SI request and sending the new SI request to the base station through the new MSG3, the processor is further configured to:
generate, by an RRC layer, a new RRC message and sending the new RRC message to a MAC layer; and
retransmit, by the MAC layer, the MSG3 by using the new RRC message to request new SI.

17. The UE of claim 13, wherein the first indication information indicates at least one of the new preamble or a new PRACH resource to the MAC layer;
wherein determining the new preamble comprises:
determining the new preamble according to the first indication information.

18. The UE of claim 14, wherein ending, by the MAC layer, the random access process implemented based on the SI request according to the second indication information comprises:
clearing, by the MAC layer, a hybrid automatic repeat request (HARQ) cache configured to transmit the MSG3.

19. A non-transitory computer-readable storage medium having stored therein instructions that, when executed by a processor of user equipment (UE), cause the UE to perform a system information (SI) request adjustment method, the method comprising:
sending, in response to a first system information block (SIB1) indicating that SI to be acquired by the UE is not being broadcast, an SI request to a base station through a first message (MSG1) or a third message (MSG3); and
sending, in response to a present SI request process not being completed yet and SI required to be requested in a next SI modification period that is entered changes relative to SI requested in the present SI request process, a new SI request to the base station through a new MSG1 or a new MSG3.

\* \* \* \* \*